Feb. 15, 1938.                F. E. LOVE                2,108,316
BOLT LOSS PREVENTION MEANS
Filed July 9, 1936
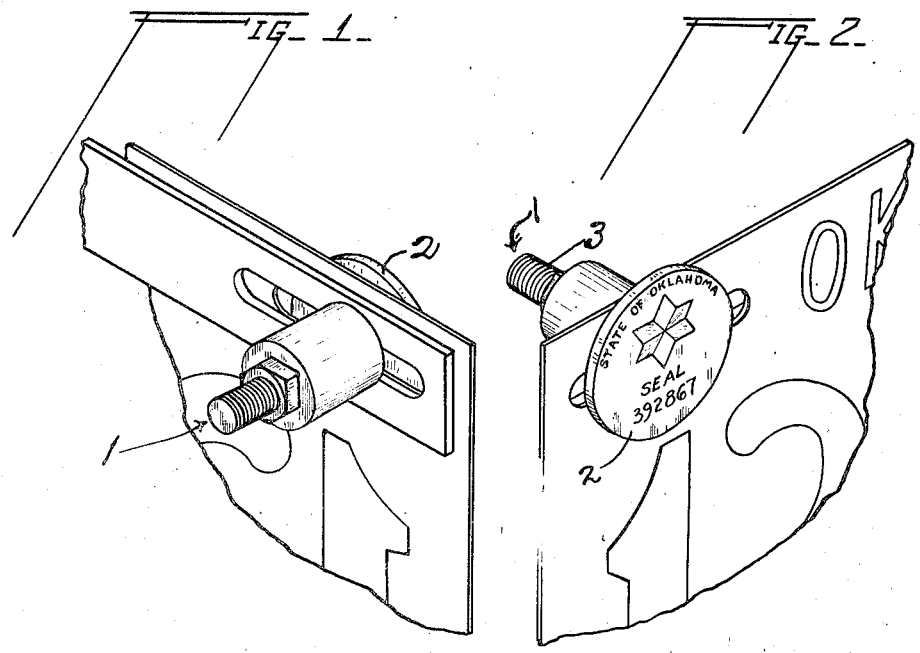
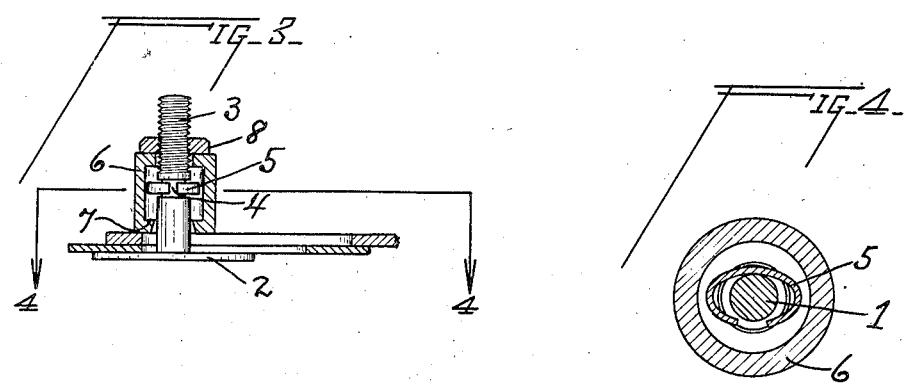
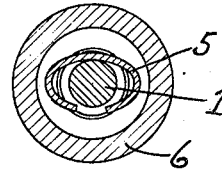
Frank E. Love
INVENTOR
BY Loyal J. Miller
ATTORNEY Patented Feb. 15, 1938

2,108,316

UNITED STATES PATENT OFFICE 2,108,316

BOLT LOSS PREVENTION MEANS

Frank E. Love, Oklahoma City, Okla.

Application July 9, 1936, Serial No. 89,699

4 Claims. (Cl. 85—1)

This invention relates to a combined locking member and bolt to be locked thereby, with means to prevent access to the locking means, so that upon the initial application of the bolt for use, the same can not be separated from the locking means except by the destruction of the means by which access to the locking means is prevented.

Other objects are to provide a device of this class which will identify a particular license plate as belonging on a particular car; which will carry identification to prove its installation on a particular car as being genuine and properly authorized; which will lock automatically when the license is installed; which will hold the license plate securely on the license bracket; which will prevent removal of the license plate unless the bolt is broken or sawed in two; which may not be re-used after it has been broken or sawed in two; which may be cheaply manufactured; which is simple and easily applied; and which will be efficient in accomplishing all the purposes for which it is intended.

My device is distinct from other devices of this class in that it allows the normal tightening of the nut on the bolt to hold the plate in place, and does not depend on the tension of a spring to hold the plate.

With these and other objects in view as will more fully appear hereinbelow, my invention consists in the construction, novel features, and combination of parts hereinafter more fully described, pointed out in the claims hereto appended, and illustrated in the accompanying one-sheet drawing, of which, Figure 1 is a perspective view of the device installed, taken from the rear;

Figure 2 is a view similar to Fig. 1 but is taken from the front;

Figure 3 is a sectional view showing the detailed inner construction of the locking member; and, Figure 4 is a detailed section taken along the line 4—4 of Fig. 3.

Like characters of reference designate like parts in all the figures.

It is understood that changes may be made in the construction and arrangement of parts without departing from the spirit of the invention as claimed, also that the drawing is to be interpreted as illustrative and not restrictive.

In the drawing numeral 1 represents a bolt having an extra large preferably flat head 2, threads 3, and an annular groove 4 intermediate the threads and the head. A locking collar 5, of a width to fit into the groove 4, substantially encircles the bolt 1 within the groove. This collar consists of an oval or an elliptic of spring steel or similar material, and is split so that upon forcing the bolt to it, the same be sprung open sufficiently to pass over the threaded portion 3 of the bolt and the shoulder forming one wall of the groove 4 when it will fit snugly at the bottom of the groove 4, while its two opposite ends extend beyond the surface of the larger shank portion of the bolt.

A substantially hollow locking barrel 6 is provided, having a well and an opening at each end to admit the shank of the bolt 1. The opening at one end is beveled from the outside, as at 7 to facilitate the entry of the oval lock collar 5 for the bolt. To enter this opening the collar 5 naturally must be compressed into the groove 4. Once inside the lock barrel, however, its spring construction causes it to assume the shape shown in Fig. 4. The barrel 6, having solid walls, does not permit the collar to again be compressed, and therefore the barrel 6 is positively locked on the shank of the bolt. The length of the barrel may, of course, be varied. It has been shown extra long in Fig. 3 for clearer illustration. Also in actual manufacture the walls of the barrel will be considerably thicker than as illustrated, and their inner surface will touch the ends of the oval shaped collar 6. A usual nut 8 is provided for firmly tightening the license plate and bracket between the bolt head 2 and the adjacent end of the lock barrel 6. If desired a common lock washer (not shown) may be used between the nut 8 and the adjacent end of the lock barrel. It will be seen that the nut may be removed at will, but when the lock barrel 6 has once been forced over and around the collar 5 it cannot be removed.

Preferably, the head of the bolt bears indicia. For instance, the motor number of the particular car on which a particular license plate is to remain, may be stamped on the bolt head along with the seal of the state, or the seal of the State highway department. The State's identification or seal could even be of opalescent material set in the bolt head. This would help police officers and authorities in identification at a glance. Such a head could not easily be duplicated by persons wishing to violate the law. Any car without one of these bolts locking the license plate could be easily noticed, stopped, and checked. It is believed that universal use of such a device would greatly reduce the theft of automobiles in this country. Stolen cars bearing stolen or transferred license plates could be more easily picked up.

In applying the device the perforation in the license is simply aligned with the bracket perforation and the bolt 1 inserted through these perforations. The lock barrel 6 is then pressed over the end of the bolt until the collar 5 enters the barrel. The nut 8 is then tightened in the usual manner.

I claim:

1. In a device, as set forth, the combination with a locking barrel having a well and axially aligned openings in the end walls of the barrel, of a partially threaded bolt shank passable through said openings, a head for said bolt shank, and remote from one end of the barrel, a nut for said bolt shank, and bearing against one end of said barrel, an annular groove in said shank and within the well intermediate of the end walls of the barrel, and a keeper movable longitudinally with relation to said barrel within the well and resiliently co-operating with the annular groove of the bolt shank and being of a size greater than the openings through which the bolt passes.

2. In a device as set forth, the combination with a locking barrel having a well, and axially aligned openings in the end walls of the barrel, of a partially threaded bolt shank passable through said openings and having a head remote from one end of the barrel, a nut for said bolt shank, and bearing against one end of said barrel, an annular groove in said shank and within the well intermediate of the end walls of the barrel, and a keeper of ovate formation split to permit contraction, and movable longitudinally with relation to said barrel, and resiliently co-operating with the annular groove of the bolt shank and being of a size greater than the diameter of the openings through which the bolt passes.

3. In a device as set forth, the combination with a locking barrel having a well, and axially aligned openings in the end walls of said barrel, of a partially threaded bolt shank passable through said openings, a head for said bolt shank, and remote from one end of the barrel, a nut for said bolt shank, and bearing against one end of said barrel, an annular groove in said shank and within the well intermediate of the end walls of the barrel, and a keeper of split ovate formation movable longitudinally with relation to said barrel, and resiliently entering the openings and co-operating likewise with the annular groove of the bolt shank and having a dimension greater when normal than the diameter of the openings through which it resiliently enters.

4. In a device as set forth, the combination with a locking barrel having a well, and axially aligned openings in the end walls of the barrel, of a partially threaded bolt shank passable through said openings, a head for said bolt shank and remote from one end of the barrel, a nut for said bolt shank and bearing against one end of said barrel, an annular groove in said shank and within the well intermediate of the end walls of the barrel, and a keeper of elliptic formation and split to yield while passing through the openings, and co-operating with the groove of the bolt shank and having a normally extended dimension greater than the diameter of the openings.

FRANK E. LOVE.